United States Patent [19]

Livingston et al.

[11] 4,083,667
[45] Apr. 11, 1978

[54] APPARATUS FOR EXTRUDING PLASTIC NETTING

[75] Inventors: Wayne W. Livingston, Osseo; Gerald W. Melin, Wyoming, both of Minn.

[73] Assignee: Bemis Company, Inc., Minneapolis, Minn.

[21] Appl. No.: 604,486

[22] Filed: Aug. 14, 1975

Related U.S. Application Data

[63] Continuation of Ser. No. 450,860, Mar. 13, 1974, abandoned.

[51] Int. Cl.$^2$ ............................................. B29F 3/04
[52] U.S. Cl. ...................... 425/192 R; 264/DIG. 81; 425/382 N; 425/464; 425/465
[58] Field of Search ............... 425/364, 370, 376 B, 425/382 N, 467, 465, 466, 190, 191, 192 R; 156/244, 167, 180, 500; 264/DIG. 81, 167, 209

[56] References Cited

U.S. PATENT DOCUMENTS

| | | | |
|---|---|---|---|
| 2,919,467 | 1/1960 | Mercer | 264/167 |
| 3,051,989 | 9/1962 | Mercer | 264/81 |
| 3,228,063 | 1/1966 | Gutierrez | 425/198 |
| 3,422,648 | 1/1969 | Lemelson | 425/466 X |
| 3,560,306 | 2/1971 | Nalle | 425/382 N |
| 3,616,080 | 10/1971 | Nalle | 425/464 |
| 3,758,359 | 9/1973 | Azuma | 156/244 |
| 3,905,743 | 9/1975 | Bagley | 425/464 |

FOREIGN PATENT DOCUMENTS

2,102,221  8/1972  Germany ........................ 425/382 N

*Primary Examiner*—Francis S. Husar
*Assistant Examiner*—Mark Rosenbaum

*Attorney, Agent, or Firm*—Koenig, Senniger, Powers and Leavitt

[57] ABSTRACT

Apparatus for extruding tubular plastic netting including concentric, counterrotatable inner and outer dies mounted in a housing with a space therein for the downward flow of molten plastic to a circular series of holes in each of the dies leading to their respective extrusion orifices, the apparatus having means for splitting the downward flow of plastic into two separate streams, one for the extrusion orifices of the inner die and the other for the extrusion orifices of the outer die, this means being formed substantially to equalize the rate of flow of the plastic to the extrusion orifices. The apparatus is also shown as including a seal arrangement in which a first and a second set of wedge seals protect bearings journalling one of the dies in the housing from the plastic, with the provision of a vent between the sets of seals so as to prevent application of pressure to the second set of seals in the vent the first set leaks. Also shown is a circular mandrel below the dies located below the surface of water in a water bath, the tubular netting surrounding the mandrel as the netting exits downwardly from the dies into the water bath. The mandrel is supported by means of a pipe which directs a flow of cooling water into the inner surfaces of the tubular netting so as to maintain the water level on the inside and outside of the tubular netting substantially the same. Also shown is means for momentarily increasing the amount of plastic extruded in timed relation to the formation of intersections of the netting filaments thereby to apply an increased amount of plastic to the filaments at the intersections so as to reinforce the latter.

20 Claims, 10 Drawing Figures

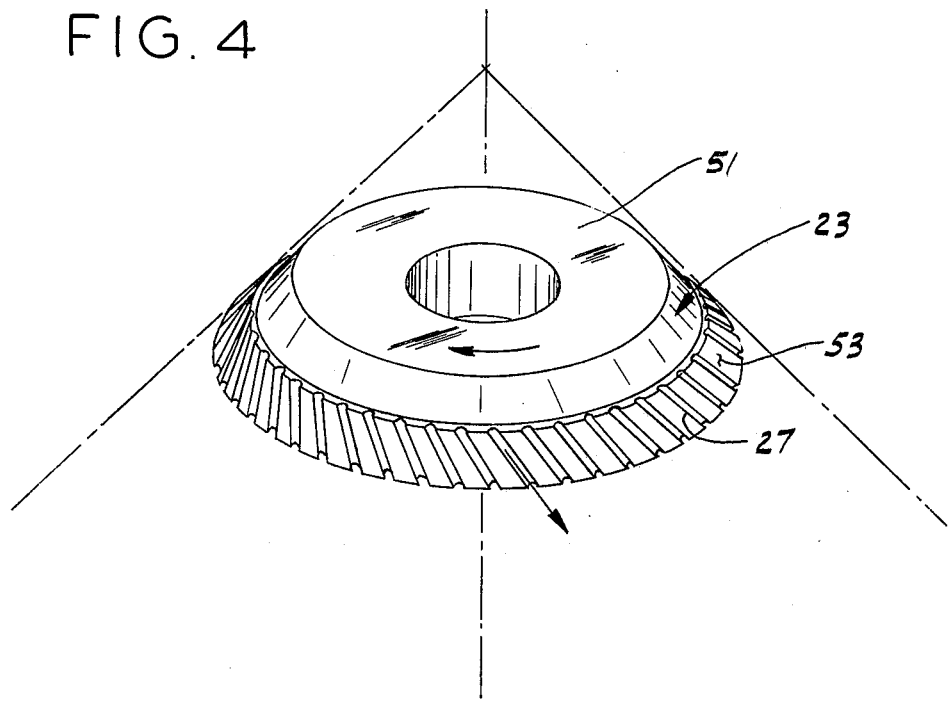
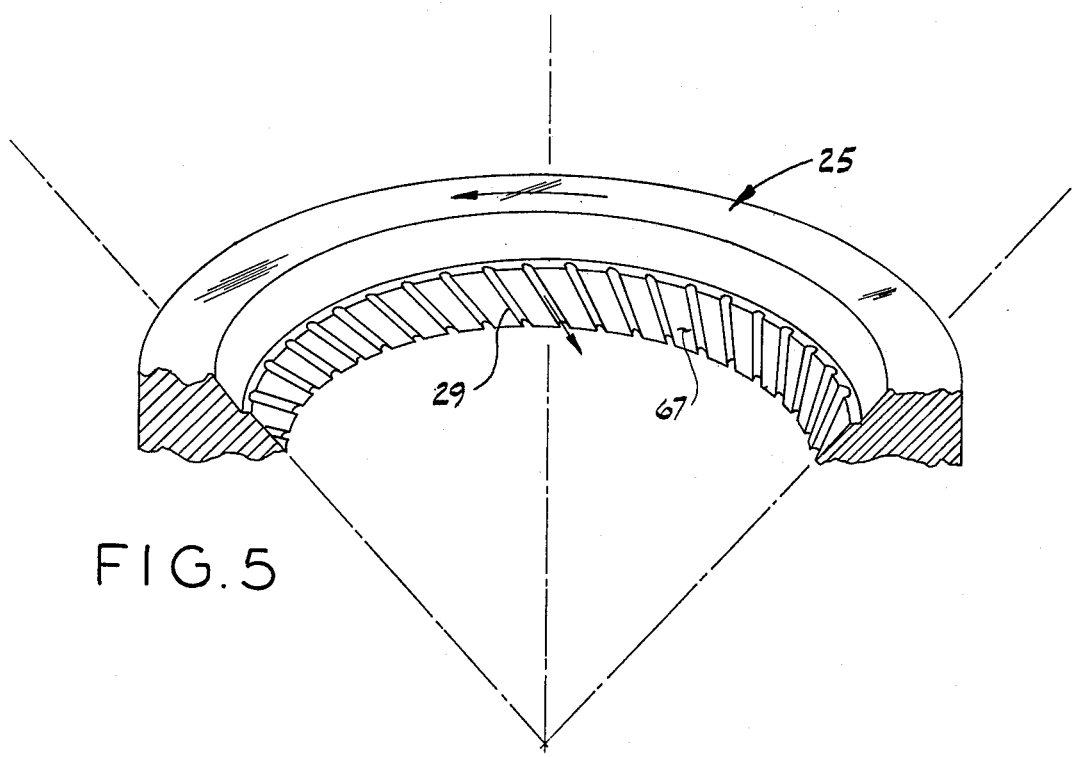

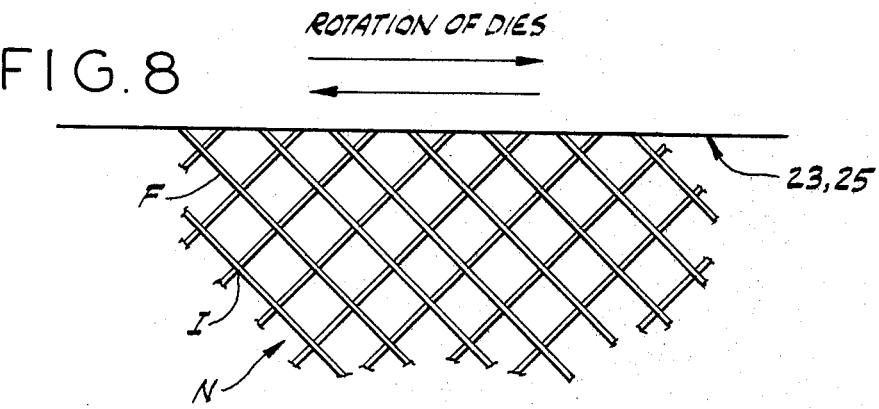
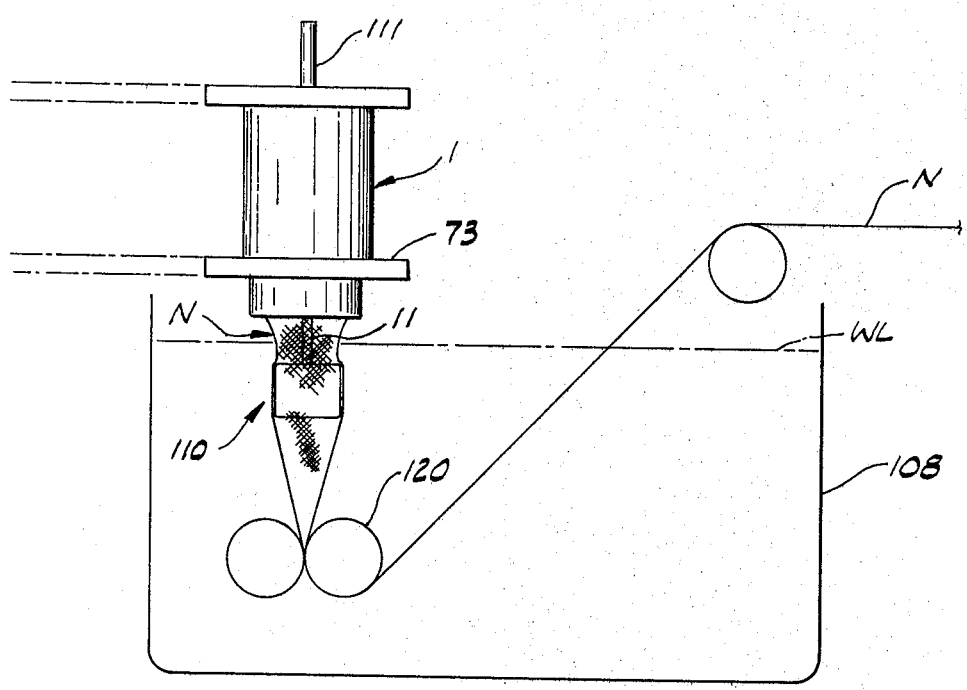

APPARATUS FOR EXTRUDING PLASTIC NETTING

This is a continuation, of application Ser. No. 450,860, filed Mar. 13, 1974, now abandoned.

BACKGROUND OF THE INVENTION

This invention relates to extruding apparatus and more particularly to apparatus for extruding plastic netting or the like.

More particularly, this invention is concerned with apparatus for extruding a plurality of filaments of plastic in such manner as to form a tube of netting in which the filaments overlap or intersect one another and are joined at intersections or "knots". Such extruding apparatus is shown, for example, in U.S. Pat. Nos. 2,919,467, 3,607,084, 3,560,306, 3,620,883 and in East German Pat. No. 52,801. Generally, tubular plastic netting is conventionally produced by forcing plastic melt through a circular series of extrusion orifices in an inner die and through an adjacent circular series of extrusion orifices in an outer die surrounding the inner die, the inner and outer dies being counterrotatable. After extrusion, the still partially molten plastic filaments forming the tube of netting are pulled down over a mandrel so as to maintain the cross-section of the tube at a desired diameter, and are quenched in a water bath. Upon cooling, the netting is often-times heated and stretched to reorient the molecular structure of the plastic so as to enhance strength, size and heat-shrink characteristics for subsequent packaging usage.

With prior extrusion apparatus, difficulty has been encountered in providing a uniform feed of plastic to the orifices of the inner and outer extrusion dies, nonuniform feed causing nonuniform extrusion of the netting. For example, the filaments extruded via some of the orifices may vary from those extruded via others. Also, it has been difficult to produce netting of consistently uniform mesh size or having uniform knot strength. It is particularly important that the netting have uniform knot strength because weak knots may separate in subsequent heating and stretching operations.

Problems have also been experienced in quenching the tubular netting in the water bath. More particularly, the downward movement of the netting into the water causes the water level on the inside of the tubing to be "pumped" below the water level at the exterior of the tubing. This unbalanced water level causes uneven cooling of the interior and the exterior of the netting and thus induces thermal stress gradients in the netting. It may also result in the netting sticking to the mandrel.

Other problems have been experienced in effectively sealing the bearings in the extruder housing which journal the outer die. Heretofore, plastic melt, in some instances, has worked its way into the bearings thus causing down time and lost production for the extruder.

SUMMARY OF THE INVENTION

Among the several objects of this invention may be noted the provision of extruding apparatus for the manufacture of plastic netting in which the plastic is fed substantially uniformly to the extrusion orifices of its inner and outer dies for substantially uniform extrusion of the netting; the provision of such apparatus which maintains the level of the cooling bath water substantially the same both interiorly and exteriorly of the tube of netting as the latter moves down into the cooling water; the provision of such apparatus which effectively prevents the plastic from contacting bearings within the apparatus; the provision of netting extrusion apparatus with means for reinforcing the knots; and the provision of such extruding apparatus which is easy to maintain and which consistently produces netting of a uniform desired mesh size and increased knot strength.

Briefly, apparatus of this invention for extruding plastic netting comprises a shaft, means mounting the shaft for rotation in one direction on a generally vertical axis, a barrel surrounding the shaft with an annular space between the shaft and the barrel for downward flow of plastic to be extruded, and means mounting the barrel for rotation in the opposite direction on the above-mentioned axis. An inner die on the lower end of the shaft and an outer die on the lower end of the barrel are provided within the barrel with the outer die surrounding the inner die. Each die has a circular series of extrusion orifices for extrusion of filaments of plastic therethrough. Means is provided for splitting the downward flow of plastic into two separate streams, one for the extrusion orifices of the inner die and the outer for the extrusion orifices of the outer die.

According to another feature of the extruding apparatus of this invention, the shaft and the barrel are rotary with respect to a housing with bearing means mounting the barrel for rotation in the housing coaxially with the shaft, and means are provided in the housing in the upper end of the barrel for sealing the bearing means from the annular space through which the plastic to be extruded flows.

A generally circular mandrel may be provided spaced below the dies within a water bath, the tubular netting being drawn down around the mandrel, the latter being supported below the dies by a nonrotatable member generally coaxial with the shaft and having a passage therethrough for the flow of the water to the mandrel. The latter has openings for the flow of water therefrom for maintaining the level of water on the inside of the tube substantially the same as on the outside of the tube as the tube moves down through the bath.

In still another variation of the extruding apparatus of this invention, means may be provided for momentarily extruding additional plastic in timed relation to the formation of intersections of the filaments thereby to apply an increased amount of plastic to the filaments at their intersection so as to reinforce the intersection.

Other objects and features of this invention will be in part apparent and in part pointed out hereinafter.

BRIEF DESCRIPTION OF THE DRAWINGS

FIG. 4 is a perspective of the lower member of the inner die having a peripheral frusto conical surface with a series of slots constituting the extrusion orifices of the inner die, these slots being inclined with respect to the generatrices of the conical surface;

FIG. 5 is a perspective of the lower ring of the outer die having a peripheral frusto conical surface with a series of slots therein constituting the extrusion orifices of the outer die, these slots being inclined relative to the generatrices of its respective conical surface;

FIG. 6 is a semi-diagrammatic view of extruding apparatus of this invention illustrating the passage of extruded plastic netting over a mandrel in a water bath;

FIG. 8 is a semi-diagrammatic representation of netting extruded by apparatus of this invention.

Corresponding reference characters indicate corresponding parts throughout the several views of the drawings.

DESCRIPTION OF THE PREFERRED EMBODIMENTS

Figure 1:
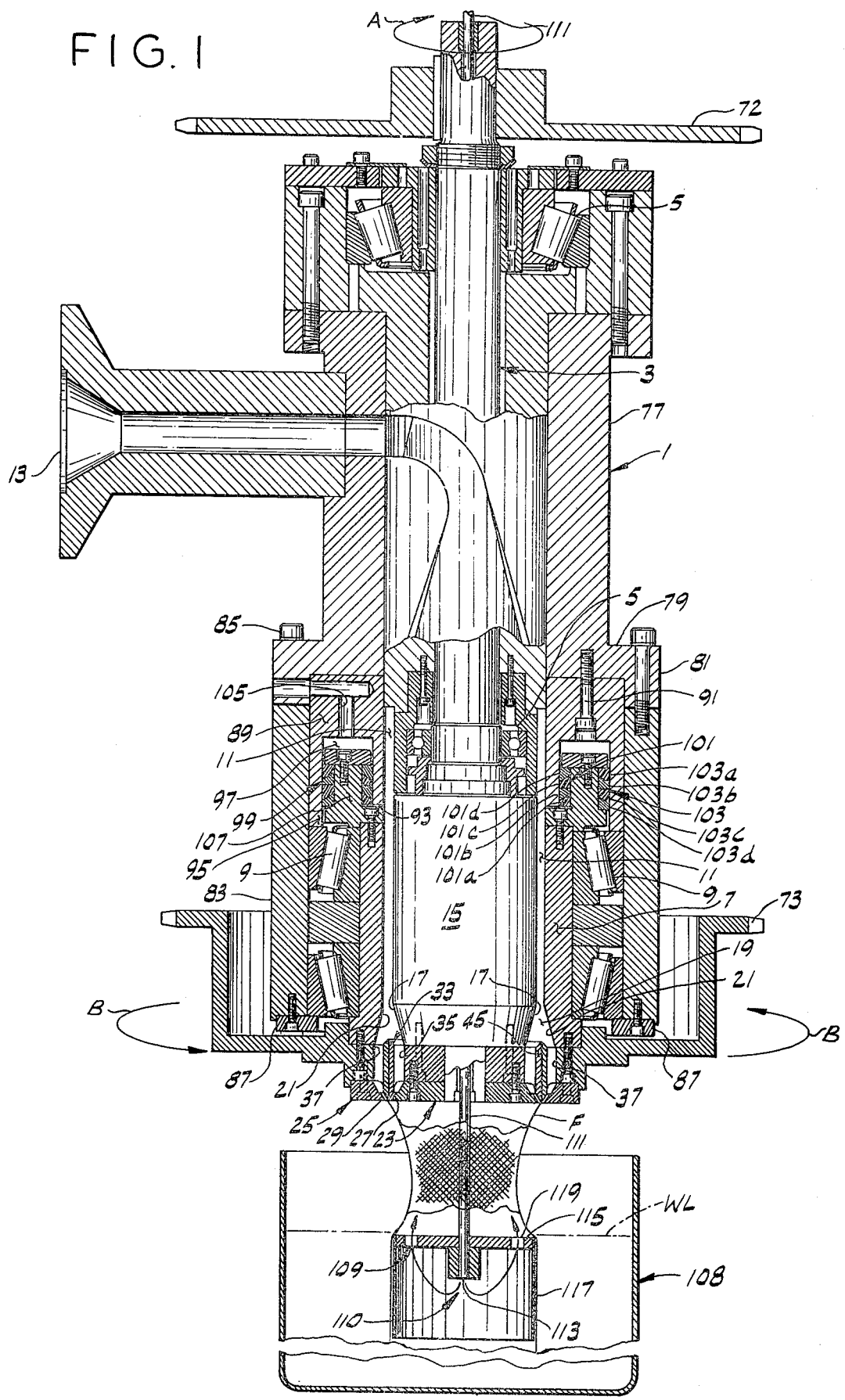
FIG. 1 is a vertical sectional view of extrusion apparatus of this invention illustrating a tube of plastic netting as its extends downwardly from the extrusion dies for passage over a mandrel and for quenching in a water bath.

Referring to the drawings, apparatus of this invention for extruding plastic and netting is shown to comprise a generally vertical extrusion housing 1. A shaft 3 extends through housing 1 from the upper end of the housing and is mounted as by means of bearings 5 for rotation in one direction (e.g. in clockwise direction as viewed from above as indicated by the arrow a in FIG. 1) on a generally vertical axis within the housing. A relatively short barrel 7 is mounted as by means of roller thrust bearings 9 for rotation in the lower end of the housing in the opposite direction (e.g. in counterclockwise direction as indicated by the "arrows B" in FIG. 1) on the vertical axis of the housing and the shaft. The shaft is of smaller diameter than the internal diameter of the extrusion housing so that there is an annular space 11 around the shaft between the shaft and the barrel for the downward flow of plastic heated to extrusion temperature and supplied to the housing via an inlet 13. The shaft has an enlarged diameter cylindrical lower end head 15 with a frusto conical inwardly tapered lower end 17. The barrel surrounds the lower end head of the shaft with a second annular space 19 therebetween connected to the first annular space 11 for the downward passage of the molten plastic to be extruded. The barrel is formed with an internal frusto conical surface 21 at its lower end surrounding the tapered lower end of head 15 and flaring or tapering outwardly opposite the taper 17.

At the lower end of shaft 3 is an inner extrusion die 23 and at the lower end of barrel 7, surrounding the inner die, is an outer extrusion die 25. The inner die has a circular series of extrusion orifices 27 for extrusion of filaments F of plastic therethrough and out from the bottom of the inner die, and the outer die 25 has a circular series of extrusion orifices 29 for extrusion of filaments of plastic therethrough and out of the bottom of the outer die. As appears in FIG. 4, the inner die orifices 27 are angled outwardly proceeding in a downward direction and the outer die orifices 29 are angled inwardly proceeding in downward direction, the lower ends of the inner and outer die passages meeting on the surfaces of an imaginary cylinder indicated in phantom at 31 in FIG. 2 for coalescence of filaments extruded via the passages.

Figure 2:
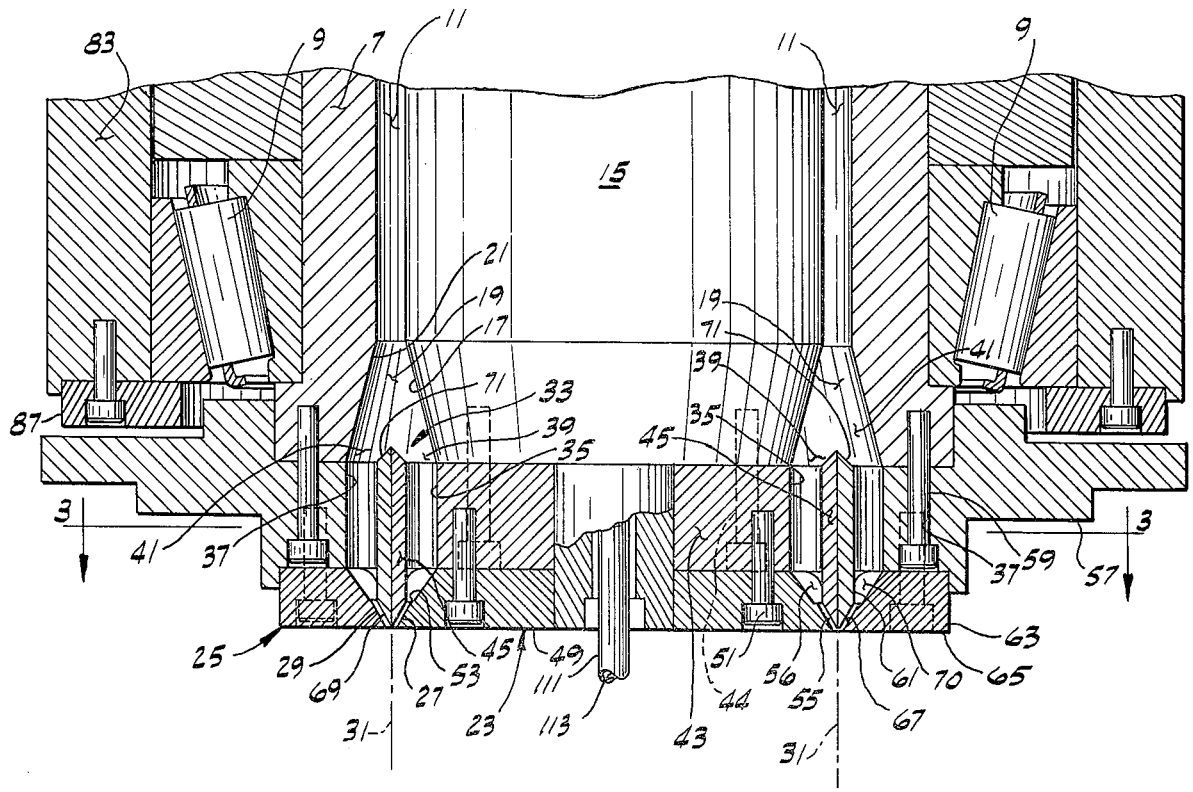
FIG. 2 is an enlarged view of the arrangement of the inner and outer dies at the lower end of the extruder.

Means, indicated generally at 33, is provided for splitting the downward flow of plastic into two separate streams, one for the extrusion orifices 27 of the inner die and the other for the extrusion orifices 29 of the outer die. As will appear, this splitting means is formed substantially to equalize the rate of flow of the plastic to the extrusion orifices. The inner and outer dies have entrance passages 35 and 37 extending down from the top. The splitting means directs one stream of plastic into the entrance passages 35 of the inner die and the other into the entrance passages 37 of the outer die. As shown in FIG. 2, the splitting means splits the flared lowered end of annular space 19 into an inner annular entrance channel 39 opening into the upper ends of the entrance passages 35 of the inner die and an outer annular entrance channel 41 opening into the upper ends of the entrance passages 37 of the outer die.

As best shown in FIG. 2, inner die 23 comprises a circular upper member 43 secured, as by bolts 44, to the lower end of shaft 3 (i.e., it is bolted to the bottom end of tapered head 15). This member 43" is of larger diameter than head 15 of the shaft and extends radially outwardly therefrom. It has a peripheral rim 45 projecting upwardly and downwardly. The inner die further comprises a circular lower member 49 secured, as with bolts 51, to the bottom end thereof. Member 49 has at its periphery a frusto conical surface 53 (see FIG. 4) flaring outwardly in downward direction. As shown in FIG. 4, extrusion orifices 27 of the inner die are formed by slots in the inner die frusto conical surface 53. As shown in FIG. 2, the inner die rim 45 has a lower beveled edge 55 sealingly engaging the inner die frusto conical surface 53 and closing the inner die slots or orifices 27. An inner die manifold 56 is further constituted by an annular space between the inner die rim 45 and the lower member 49 above the inner die beveled edge 55, this annular space being in communication with the upper ends of slots 27. Entrance passages 35 are arranged in member 43 as a circular series of equally spaced holes around its margin adjacent rim 45, these entrance passages providing for communication from the annular space 19 and the inner die manifold 56.

Outer die 25 comprises a circular upper ring 57 secured to barrel 7 by means of bolts 59. Ring 57 is of larger diameter than inner die 23. It extends below barrel 7 and has an inner peripheral rim 61 extending downwardly and upwardly therefrom. Outer die 25 further includes a lower ring member 63 secured, as by bolts 65, on the bottom face of ring 57. Ring 63 has a generally frusto conical inner periphery 67 flaring outwardly in upward direction. The outer die extrusion orifices 29 are formed by slots in this outer die frusto conical periphery 67 (see FIG. 5). Outer die rim 61 has a lower beveled edge 69 engaging the outer die frusto conical periphery 67 in sealing engagement therewith and thus closes the outer die extrusion slots 29. An outer die manifold 70 is formed by an annular space between outer die rim 61 and lower ring 63 above beveled edge 69 in communication with the upper ends of the slots 29. Entrance passages 37 are arranged in ring 57 as a circular series of equally spaced holes around its margin adjacent rim 61, these entrance passages providing for communication from the annular space 19 to the outer die manifold 70. Thus, splitting means 33 is constituted by inner and outer annular entrance channels 39 and 41, by entrance passages 35 and 37, and by manifolds 56 and 70.

Rims 45 and 51 are in rotary sealing engagement with one another and, as shown, their upper ends are beveled as indicated at 71 to form a knife edge for splitting the flow of plastic to the inner and outer die entrance channels 39 and 41, respectively. It will be understood that this knife edge is not essential. A sprocket 72 is affixed to the upper end of shaft 3 for rotating the shaft and the inner die. As shown in FIG. 1, upper ring 57 includes a sprocket 73 around which a chain may be trained for rotating the outer die and barrel 7 in the direction opposite to the rotation of inner die 23.

Figure 3:
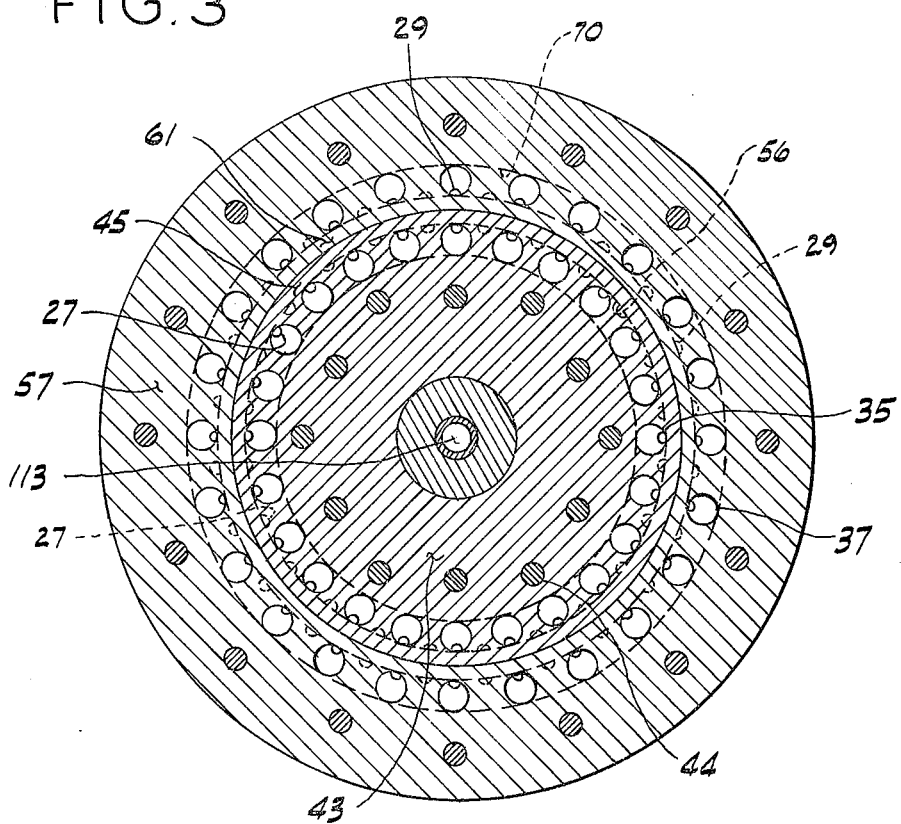
FIG. 3 is a horizontal sectional view taken on line 3—3 of FIG. 2 illustrating two series of equally spaced holes, one series in the inner die and the other series in the outer die, for supplying plastic melt to the extrusion orifices of the dies.

With the inner die holes 35 and the outer die holes of equal diameter and with the member of inner die holes equal to the number of outer die holes, as shown in FIG. 3, and with the holes 35 in the inner die 23 feeding the inner die manifold 56 which in turn feeds the inner die extrusion orifices 27, and the holes 37 in the outer die 25 feeding the outer die manifold 70 which in turn feeds the outer die extrusion orifices 29, the splitting means 33 substantially equalizes the rate of flow of the plastic to the orifices 27 and 29, and effects substantially uniform flow of plastic through the apparatus. By "substantially uniform flow" here is meant that residence time in the apparatus of plastic extruded as any given filament is substantially the same as the residence time in the apparatus of plastic extruded as any other filament. This not only produces netting of more uniform consistency, but is important when extruding certain plastics, such as polyvinyl chloride, which may tend to degrade if resident too long in the extruder. Also, the filaments are extruded through the inner and outer die orifices 27 and 29 at a substantially uniform rate, and this achieves more uniform filament size and more uniform mesh size for the netting.

As noted above, referring to FIG. 3, the inner die holes 35 and the outer die holes 37 are of equal diameter, with the number of inner die holes 36 equal to the number of outer die holes 37. The number of inner die holes 35 will generally be considerably less than the number of inner die orifices 27, and the number of outer die holes 37 will generally be considerably less than the number of outer die orifices 29. For example, there may be half as many holes in each die as orifices, as illustrated in FIG. 3, although different members 49 and 63 with different numbers of slots 27 and 29 may be used in conjunction with the same members 43 and 57 to provide different numbers of extrusion orifices.

As best shown in FIGS. 4 and 5, inner die extrusion orifices 27 and outer die extrusion orifices 29 are formed as slots on the inner and outer frusto conical peripheries 53 and 67 of the inner and outer dies, respectively. These slots are shown to be inclined with respect to the generatrices of conical surfaces 53 and 67 for improving extrusion of the netting. The angled or biased slot arrangement constitutes the subject of the separate co-assigned patent application Ser. No. 450,859, filed Mar. 13, 1974 by the inventors of the present invention.

Housing 1 comprises an upper section 77 having an outwardly extending flange 79 at its lower end with a downwardly extending annular rim 81 on this flange, and a cylindrical lower section 83 secured, as indicated at 85, to the rim and extending downwardly therefrom. Bearings 9 for barrel 7 are mounted in section 83, with a retainer 87 at the lower end of the section. An annular sealing member 89 is secured, as indicated at 91, to the bottom of flange 79 within the lower housing section 83 above bearings 9 in the barrel. This sealing member has a circular recess 93 at its lower end for forming a downwardly extending lower annular rim 95 on the member and is formed with an annular channel 97 therein. As indicated generally at 99 in FIG. 1, sealing means are provided for sealing bearings 9 from the plastic melt in annular passage 11 thereby to prevent damage to or fouling of the bearings.

More particularly, sealing means 99 comprises a first set of seals 101 and a second set of seals 103 in series between annular space 11 and bearing 9 with a pressure vent 105 to the atmosphere between the seals 101 and 103. Barrel 7 has a cylindrical extension 107 at its upper end extending into channel 97. Seal 101 is constituted by a first set of wedge seal rings pressurized by plastic from annular space 11 and seal 103 is constituted by a second set of similar wedge seal rings in surrounding relation to the first set. Each set of wedge seals comprises four wedge seal rings denoted $a$ - $d$. Rings $a$ and $c$ are made of a resilient low-friction material such as "Teflon", and rings $b$ and $d$ are made of a rigid material such as "Teflon" filled with glass and molybdenum disulfide sold under the trade name "Eblon" by E. I. du Pont de Nemours & Co. The rings have tapered or wedge shaped end faces in face-to-face contact, as shown. It will be understood that in the event the first set of rings 101 leaks plastic therepast, the plastic will be vented to the atmosphere via vent 105 thereby to prevent the application of pressure to the second set of seals 103 and thus positively protect the bearings from the leakage of plastic thereonto.

As shown in FIG. 8, on counterrotation of the inner and outer dies 23 and 25, plastic filaments F extruded from orifices 27 of inner die 23 and orifices 29 of outer die 25 coalesce and form a tube of plastic netting N, which passes downwardly from the dies. A water bath, as indicated generally at 108 (see FIGS. 1 and 6), is spaced below the dies into which the tubular netting flows for cooling of plastic. The water level WL of the bath is typically spaced a relatively short distance (e.g., 2–3 inches) below the dies. Upon exiting the dies, the netting shrinks or necks down as it is partially cooled in the air. A circular mandrel 109 is spaced below the dies below water level WL in the bath. The tubular netting surrounds the mandrel, the latter being of a diameter somewhat larger than the necked-down diameter of the netting. The interior surface of the netting is engageable with the outer periphery of the mandrel, thereby to guide the netting and to stretch it approximately back to its as-extruded diameter.

With high speed extruding apparatus, the downward movement of the netting into the water bath has heretofore caused the water inside the netting to be "pumped down" thus making the water level higher on the outside of the netting than on its inside. This difference in water levels has caused uneven cooling of the inside and outside of the netting, which may cause relative movement of the filaments at an intersection. This in turn weakens the intersection and may cause separation of the intersection upon subsequent orientation operations. Also, the inner surfaces of the filaments may be still partially molten upon engaging the mandrel, thus tending to stick to the mandrel and making it more difficult to draw the netting over the mandrel. Additionally, without water between the periphery of the mandrel and the netting, there is no lubrication as between the mandrel and netting for low-friction passage of the netting. To overcome these problems, means indicated at 110 is provided for a flow of cooling water into the mandrel to maintain the level of the water on the inside of the tubular netting substantially the same as the level of the water bath on the outside of the tubing as the tubing moves down through the bath.

More particularly, mandrel 109 is nonrotatably supported below dies 23 and 25 by means of a tube or pipe 111 coaxial with shaft 3 and extending downwardly therethrough. Tube 111 has a passage 113 (see FIG. 3) therethrough for the flow of cooling water to the mandrel. Mandrel 109 includes a generally horizontal circular plate 115 secured to tube 111 and a cylindric skirt 117 secured to its outer periphery and extending therebelow. Plate 115 has one or more openings 119 therein to permit water flowing from tube 111 to flow upwardly through openings 119 to contact the inner surface of the netting and to thus maintain the water level inside the netting the same as the water level on the outside of the tubular netting. Upon passing from the mandrel, the netting is folded flat by rollers 120 (see FIG. 6) and delivered from the water bath for subsequent stretching and orientation.

Figure 7A:
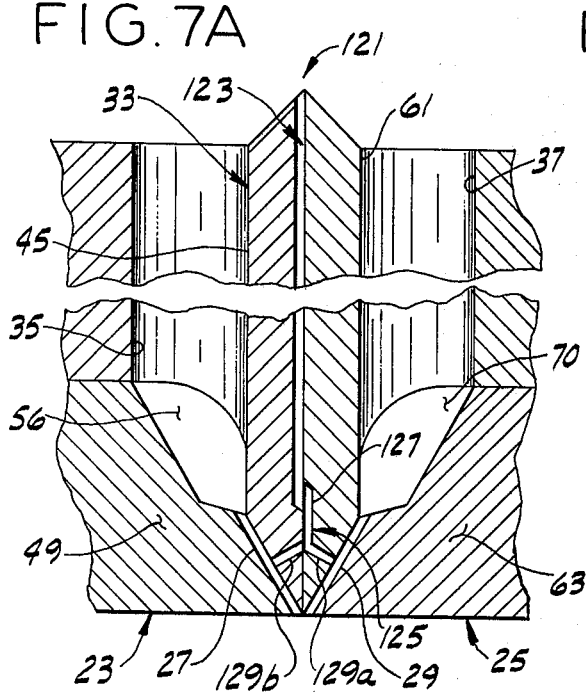
FIGS. 7A–7C are enlarged cross-sectional views of other embodiments of the extruding apparatus of this invention illustrating means for reinforcing the knots of the plastic netting being formed by momentarily extruding additional amounts of plastic into the intersections of the filament when the intersections are formed.
Figure 7B:
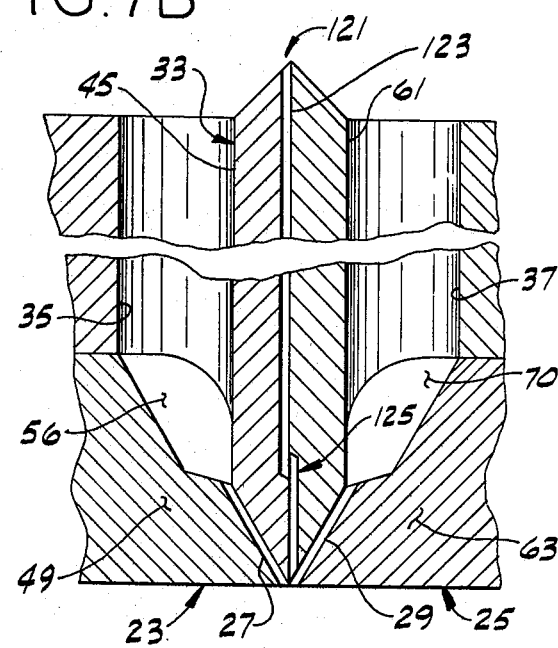
Figure 7C:
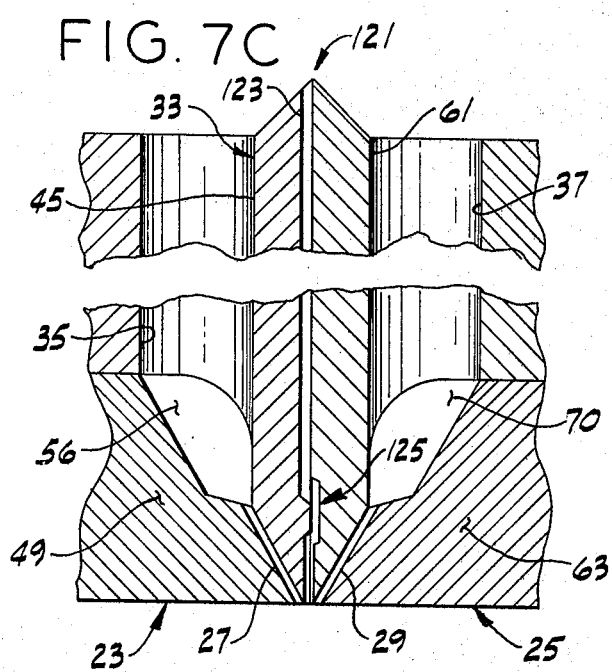

In accordance with this invention, means as indicated generally at 121 and as shown in FIGS. 7A-7C, may be provided for momentarily extruding additional plastic in timed relation to the formation of intersections I of filaments F (see FIG. 8) thereby to apply increased amounts of plastic to the filaments at their intersections so as to reinforce the intersections.

Generally, with the extrusion slots 27 and 29 of the inner and outer dies 23 and 27, respectively, being out of register, each slot extrudes an individual plastic filament F, and upon the extrusion slots moving into register with one another, intersections I of netting N are formed. In prior apparatus, the filaments at the intersections oftentimes have not had sufficient contact area with one another to provide adequate intersection bonding. Upon subsequent stretching and heating operations (i.e., for purposes of orientation of the plastic netting), the filaments may separate from one another.

More particularly, intersection reinforcing means 121 comprises a first series of auxiliary flow passages 123 in one of the flow divider rims, for example in inner die rim 45, there being one auxiliary flow passage 123 provided for each extrusion orifice 27. As shown, the upper end of each auxiliary passage 123 constitutes its inlet end and it is in communication with annular space 19 for the intake of plastic melt. The lower end of each auxiliary passage 123 terminates short of its respective extrusion orifice or slot 27 at the interface between rims 45 and 61. The other die rim (i.e., rim 61 of outer die 25) has a second series of auxiliary flow passage 125 therein, one for each extrusion orifice 29 in the outer die. The upper end of each auxiliary passage 125 is at the interface of rims 45 and 61 and is so positioned to be in communication with the outlet end of a respective auxiliary passage 123 in the inner die at predetermined times as the inner and outer dies counterrotate relative to one another so as to extrude an additional amount of plastic for inclusion in the intersection. The lower end of each auxiliary passage is in communication with at least one extrusion orifice 27 or 29 in the dies.

In FIG. 7A, auxiliary passage 125 is shown to be branched, having an inlet leg 127, a first outlet branch 129a in outer rim 61 and a second outlet branch 129b in inner rim 45, outlet branches 129a, 129b being in register when auxiliary passages 123 and 125 are in register.

In FIG. 7B, a modification of auxiliary flow passages 125 are shown in which the passages are slots in the outer periphery of rim 61 extending downwardly along the inter-face of rims 45 and 61 for communication with the outlet end of the extrusion orifices 27 and 29 when the extrusion orifices are in register.

In FIG. 7C, another modification is shown in which the auxiliary passages 125 have an offset and portions in both rims adapted to be in register when the outlet end of passage 123 is in register with the inlet end of passage 125.

Operation of the means 121 shown in FIGS. 7A-7C is essentially the same and thus only operation of the embodiment shown in FIG. 7A will be described in detail. As dies 23 and 25 counterrotate, the extrusion orifices 27 and 29 therein come in and out of register. When the orifices are out of register, a single filament F is extruded from each orifice and when the orifices are in register, an intersection I between adjacent filaments is formed. The outlet ends of auxiliary passages 123 and the inlet ends of auxiliary passages 125 are so positioned relative to their respective extrusion orifices that when the extrusion orifices are in register with one another, an additional charge of plastic will be forced through auxiliary passages 123 and 125 for inclusion within the intersection. In certain circumstances, the outlet end of passage 123 and the inlet end of passage 125 may come in register slightly before the extrusion orifices come into register (i.e., the register of the auxiliary flow passage leads the register of the extrusion orifices) so that the intersections are reinforced at the proper instant.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for extruding plastic netting comprising a shaft, means mounting the shaft for rotation in one direction on a generally vertical axis, a barrel surrounding the shaft with an annular space between the shaft and barrel for downward flow of plastic to be extruded, means mounting the barrel for rotation in the opposite direction on said axis, an inner die on the lower end of the shaft and an outer die on the lower end of the barrel surrounding the inner die, each die having a circular series of extrusion orifices for extrusion of filaments of plastic therethrough, and means operatively associated with said orifices for splitting the downward flow of plastic through said annular space into two separate streams, one for the extrusion orifices of the inner die and the other for the extrusion orifices of the outer die, said splitting means comprising an inner set of passages associated with the inner die for flow of plastic from said annular space to the extrusion orifices of the inner die and on outer set of passages associated with the outer die for flow of plastic from said annular space to the extrusion orifices of the outer die, the total cross-sectional area of the passages of the inner set being substantially equal to the total cross-sectional area of the passages of the outer set substantially to equalize the rate of flow of the plastic from said annular space to the extrusion orifices for the inner die and the rate of flow of the plastic to the extrusion orifices of the outer die.

2. Apparatus as set forth in claim 1 wherein said splitting means comprises a manifold in the inner die in communication with the inner die extrusion orifices at their upper ends, and a manifold in the outer die in communication with the outer die extrusion orifices at their upper ends, the passages of said inner set extending down to the inner die manifold and the passages of said outer set extending down to the outer die manifold.

3. Apparatus as set forth in claim 2 having an annular entrance channel at the top of the inner die in communication with the inner die manifold via the passages of said inner set, and an annular entrance channel at the top of the outer die in communication with the outer die manifold via the passages of said outer set.

4. Apparatus as set forth in claim 3 wherein the lower end of the shaft and the lower end of the base of the barrel are tapered so that the lower end of said annular space is flared, and wherein the annular channel at the top of the inner die is located toward the inside of said flared lower end of said annular space and the annular channel of the outer die is located toward the outside of said flared lower end of said annular space, and wherein the passages of the inner set extend down from the annular channel at the top of the inner die to the inner die manifold and the passages of the outer set extend down from the annular channel at the top of the outer die to the outer die manifold.

5. Apparatus for extruding plastic netting comprising a shaft, means mounting the shaft for rotation in one direction on a generally vertical axis, a barrel surrounding the shaft with an annular space between the shaft and barrel for downward flow of plastic to be extruded, means mounting the barrel for rotation in the opposite direction on said axis, an inner die on the lower end of the shaft and an outer die on the lower end of the barrel surrounding the inner die, each die having a circular series of extrusion orifices for extrusion of filaments of plastic therethrough, and means operatively associated with said orifices for splitting the downward flow of plastic into two separate streams, one for the extrusion orifices of the inner die and the other for the extrusion orifices of the outer die, said splitting means being formed substantially to equalize the rate of flow of the plastic to said extrusion orifices, said splitting means comprising a manifold in the inner die for supplying plastic to the inner die extrusion orifices, a manifold in the outer die for supplying plastic to the outer die extrusion orifices, and means operatively associated with said inner and outer die manifolds for dividing the downward flow of plastic into a supply for the inner die manifold and a supply for the outer die manifold, the inner die comprising a circular upper inner die member secured to the lower end of the shaft and being of larger diameter than the lower end of the shaft and extending radially outwardly from the shaft at its lower end, said upper member having a peripheral rim projecting downwardly therefrom, and a circular lower inner die member secured on the bottom of said upper member having a generally frusto conical periphery flaring outwardly in downward direction, the inner die extrusion orifices being formed by slots in said inner die frusto conical periphery, said peripheral rim having a lower beveled edge engaging said inner die frusto conical surface and closing the inner die slots, the inner die manifold being constituted by an annular space between said peripheral rim and said lower inner die member above said inner die beveled edge in communication with the upper ends of said slots, and said upper member having holes outward of the lower end of the shaft for communication from said annular space between said shaft and said barrel to the inner die manifold.

6. Apparatus for extruding plastic netting comprising a shaft, means mounting the shaft for rotation in one direction on a generally vertical axis, a barrel surrounding the shaft with an annular space between the shaft and barrel for downward flow of plastic to be extruded, means mounting the barrel for rotation in the opposite direction on said axis, an inner die on the lower end of the shaft and an outer die on the lower end of the barrel surrounding the inner die, each die having a circular series of extrusion orifices for extrusion of filaments of plastic therethrough, and means operatively associated with said orifices for splitting the downward flow of plastic into two separate streams, one for the extrusion orifices of the inner die and the other for the extrusion orifices of the outer die, said splitting means being formed substantially to equalize the rate of flow of the plastic to said extrusion orifices, said splitting means comprising a manifold in the inner die for supplying plastic to the inner die extrusion orifices, a manifold in the outer die for supplying plastic to the outer die extrusion orifices, and means operatively associated with said inner and outer die manifolds for dividing the downward flow of plastic into a supply for the inner die manifold and a supply for the outer die manifold, the outer die comprising a circular upper ring secured to said barrel of larger diameter than said inner die and extending below said barrel, said upper ring having an inner peripheral rim extending downwardly therefrom, and a lower ring member secured on the bottom of said upper ring having a generally frusto conical inner periphery flaring outwardly in upward direction, the outer die extrusion orifices being formed by slots in said outer die frusto conical periphery, said rim of said upper ring having a lower beveled edge engaging said outer die frusto conical periphery and closing the slots, said outer die manifold being constituted by an annular space between said rim of said upper ring and said lower ring above said outer die beveled edge in communication with the upper ends of the slots, said upper ring having a plurality of holes therein for communication from said annular space between said shaft and said barrel and said outer die manifold.

7. Apparatus for extruding plastic netting comprising a shaft, means mounting the shaft for rotation in one direction on a generally vertical axis, a barrel surrounding the shaft an annular space between the shaft and barrel for downward flow of plastic to be extruded, means mounting the barrel for rotation in the opposite direction on said axis, an inner die on the lower end of the shaft and an outer die on the lower end of the barrel surrounding the inner die, each die having a circular series of extrusion orifices for extrusion of filaments of plastic therethrough, and means operatively associated with said orifices for splitting the downward flow of plastic into two separate streams, one for the extrusion orifices of the inner die and the other for the extrusion orifices of the outer die, said splitting means formed substantially to equalize the rate of flow of the plastic to said extrusion orifices, said splitting means comprising a manifold in the inner die for supplying plastic to the inner die extrusion orifices, a manifold in the outer die for supplying plastic to the outer die extrusion orifices, and means operatively associated with said inner and outer die manifolds for dividing the downward flow of plastic into a supply for the inner die manifold and a supply for the outer die manifold, the inner die comprising a circular upper inner die member secured to the lower end of the shaft and being of larger diameter than the the lower end of the shaft and extending radially outwardly from the shaft at its lower end, said upper member having a peripheral rim projecting downwardly therefrom, and a circular lower inner die member secured on the bottom of said upper member having a generally frusto conical periphery flaring outwardly in downward direction, the inner die extrusion orifices being formed by slots in said inner die frusto conical periphery, said peripheral rim having a lower beveled edge engaging said inner die frusto conical surface and closing the inner die slots, the inner die manifold being constituted by an annular space between said peripheral rim and said lower inner die member above said inner die beveled edge in communication with the upper ends of said slots, and said upper member having holes outward of the lower end of the shaft for communication from said annular space between said shaft and said barrel to the inner die manifold, the outer die comprising a circular upper ring secured to said barrel of larger diameter than said inner die and extending below said barrel, said upper ring having an inner peripheral rim extending downwardly therefrom, and a lower ring member secured on the bottom of said upper ring having a generally frusto conical inner periphery flaring outwardly in upward direction, the outer die extrusion orifices being formed by slots in said outer die frusto conical periphery, said rim of said upper ring having a lower beveled edge engaging said outer die frusto conical periphery and closing the slots, said outer die manifold being constituted by an annular space between said rim of said upper ring and said lower ring above said outer die beveled edge in communication with the upper ends of the slots, said upper ring having a plurality of holes therein for communication from said annular space between said shaft and said barrel and said outer die manifold.

8. Apparatus as set forth in claim 6 wherein the outer peripheral surface of said inner die rim and the inner peripheral surface of said outer die rim are in rotary sealing engagement.

9. Apparatus as set forth in claim 8 wherein said outer die rim and said inner die rim extend above the plane of the upper ends of said holes in said upper ring and said upper member, respectively.

10. Apparatus as set forth in claim 9 wherein the upper ends of said outer and inner die rims are beveled to form a knife edge.

11. Apparatus as set forth in claim 7 wherein said upper ring includes driving means operatively associated with said barrel and said outer die for rotation of said barrel and said outer die in said opposite direction to the inner die.

12. Apparatus for extruding plastic netting with reinforced intersections between intersecting net filaments comprising an extrusion housing, an inner die rotatable in the housing in one direction having a plurality of extrusion orifices therein for forming netting filaments, an outer die surrounding said inner die, said outer die being rotatable relative to the housing on a common axis with the inner die in opposite direction thereto and having a plurality of extrusion orifices for forming netting filaments, said orifices in the outer die being in close proximity to the orifices in the inner die, said counterrotation of the inner and outer orifices causing filaments formed thereby to form said intersections, a flow path in said housing for the flow of plastic to said inner and outer extrusion orifices, and means operatively associated with said orifices for momentarily extruding additional plastic in timed relation to the formation of an intersection of said filaments thereby to apply an increased amount of plastic to the filaments at their intersections so as to reinforce said intersections, and further comprising means for splitting the flow of plastic into two streams, one for the orifices of the inner die and the other for the orifices of the outer die, said splitting means comprising an outer rim on the inner die and an inner rim on the outer die, said rims being in rotary sealing engagement and being counterrotatable relative to one another with their respective dies, one of said rims having a first series of auxiliary flow passages therein, one for each extrusion orifice in its respective die, each of said first auxiliary flow passages having one end thereof constituting an inlet end in communication with said flow path and having its other end constituting its outlet end terminating short of a respective extrusion orifice in said one die at the interface between said inner and outer rims, and the other of said rims having a second series of auxiliary flow passages therein, one for each extrusion orifice in its respective die, each of said second auxiliary flow passages having one end thereof constituting its inlet end at the interface of said inner and outer rims and having its other end constituting its outlet end in communication with at least one respective extrusion orifice, said outlet end of said first auxiliary flow passage and said inlet end of said second auxiliary flow passage being positioned relative to one another so that said first and second auxiliary flow passages are in communication with one another in timed relation to the formation of said intersections thereby momentarily to extrude an additional charge of plastic for reinforcement of the intersection being formed.

13. Apparatus as set forth in claim 12 wherein the outlet end of said second auxiliary flow passage is in communication with its respective extrusion orifice intermediate the inlet and outlet ends thereof.

14. Apparatus as set forth in claim 13 wherein said one rim having said first series of auxiliary flow passages therein has another series of auxiliary flow passages therein extending from a corresponding extrusion orifice intermediate the inlet and outlet ends thereof to said second auxiliary passage in the other rim whereby additional plastic material is momentarily extruded into both the extrusion orifices of the inner and outer dies.

15. Apparatus as set forth in claim 14 wherein the outlet end of said second auxiliary flow path communicates with its respective extrusion orifice in its respective die adjacent the outlet end of said respective extrusion orifice.

16. Apparatus as set forth in claim 12 wherein the outlet end of said second auxiliary flow path is in communication with its respective extrusion orifices in its respective die and with a corresponding extrusion orifice in the other die adjacent the outlet ends of both of said extrusion orifices.

17. Apparatus for extruding plastic netting with reinforced intersections between intersecting net filaments comprising an extrusion housing, an inner die rotatable in the housing in one direction having a plurality of extrusion orifices therein for forming netting filaments, an outer die surrounding said inner die, said outer die being rotatable relative to the housing on a common axis with the inner die in opposite direction thereto and having a plurality of extrusion orifices for forming netting filaments, said orifices in the outer die being in close proximity to the orifices in the inner die, said counterrotation of the inner and outer orifices causing filaments formed thereby to form said intersections, a flow path in said housing for the flow of plastic to said inner and outer extrusion orifices, and means operatively associated with said orifices for momentarily extruding additional plastic in timed relation to the formation of an intersection of said filaments thereby to apply an increased amount of plastic to the filaments at their intersections so as to reinforce said intersections.

18. Apparatus for extruding plastic netting comprising an inner die and an outer die surrounding the inner die, said dies being rotatable in opposite directions, each die having a circular series of extrusion orifices, each die comprising an inner member and an outer member having mutually interengageable peripheral surfaces and being nonrotatably secured together with said surfaces in nonrotatable sealing engagement, the orifices being formed by slots in one of said surfaces.

19. Apparatus for extruding plastic netting comprising a shaft, means mounting the shaft for rotation in one direction on a generally vertical axis, a barrel surrounding the shaft with an annular space between the shaft and barrel for downward flow of plastic to be extruded, means mounting the barrel for rotation in the opposite direction on said axis, an inner die on the lower end of the shaft and an outer die on the lower end of the barrel surrounding the inner die, each die having a circular series of extrusion orifices for extrusion of filaments of plastic therethrough, each die comprising an inner member and an outer member having mutually interengageable peripheral surfaces and being nonrotatably secured together with said surfaces in nonrotatable sealing engagement, the orifices being formed by slots in one of said surfaces.

20. Apparatus as set forth in claim 19 having means operatively associated with said inner and outer dies for splitting the downward flow of plastic into two separate streams, one for the extrusion orifices of the inner die and the other for the extrusion orifices of the outer die, said splitting means being formed substantially to equalize the rate of flow of the plastic to said extrusion orifices.

* * * * *

UNITED STATES PATENT AND TRADEMARK OFFICE
CERTIFICATE OF CORRECTION

PATENT NO. : 4,083,667
DATED : April 11, 1978
INVENTOR(S) : Wayne W. Livingston and Gerald W. Melin It is certified that error appears in the above-identified patent and that said Letters Patent are hereby corrected as shown below:

Column 2, line 56, "its" should read -- it --. Column 3, line 37, ""arrows B""should read -- arrows B --. Column 4, line 22, "43"" should read -- 43 --.
Column 8, line 38, "WE CLAIM:" should read --WHAT IS CLAIMED IS: --; column 8, claim 1, line 57, "on" should read -- an --. Column 10, claim 7, line 57, "means formed" should read -- means being formed --. Column 11, claim 8, line 3? "6" should read -- 7 --.

Signed and Sealed this

Twenty-sixth Day of September 1978

[SEAL]

Attest:

RUTH C. MASON
Attesting Officer

DONALD W. BANNER
Commissioner of Patents and Trademarks